United States Patent [19]

Ōi et al.

[11] Patent Number: 4,604,207
[45] Date of Patent: Aug. 5, 1986

[54] PACKING MATERIALS FOR CHROMATOGRAPHIC USE AND A METHOD FOR ANALYSIS OF AN ENANTIOMER MIXTURE USING THE SAME

[75] Inventors: Naobumi Ōi, Kyoto; Tadashi Doi, Toyonaka; Masayuki Nagase, Suita, all of Japan

[73] Assignee: Sumitomo Chemical Co., Ltd., Osaka, Japan

[21] Appl. No.: 585,825

[22] PCT Filed: May 18, 1983

[86] PCT No.: PCT/JP83/00145
§ 371 Date: Jan. 18, 1984
§ 102(e) Date: Jan. 18, 1984

[87] PCT Pub. No.: WO83/04103
PCT Pub. Date: Nov. 24, 1983

[30] Foreign Application Priority Data

May 19, 1983 [JP] Japan .................................. 57-85496

[51] Int. Cl.[4] .............................................. B01D 15/08
[52] U.S. Cl. .................................... 210/635; 210/656; 252/184; 521/38
[58] Field of Search ................... 210/656, 198.2, 510.2, 210/635; 252/184; 521/38

[56] References Cited

U.S. PATENT DOCUMENTS 4,322,310  3/1982  House ................................. 210/656
4,324,681  4/1982  House ................................. 210/656

OTHER PUBLICATIONS

Haro et al–Journal of Chromat. 186, (1979), pp. 543–552.
S. Weinstein et al–Journal of Chromatography, 126 (1976), 97–111.
W. Pirple et al–Journal of Chromatography 123, (1976), 400–404.

Primary Examiner—Joseph L. Schofer
Assistant Examiner—Peter F. Kulkosky
Attorney, Agent, or Firm—Sughrue, Mion, Zinn, Macpeak & Seas

[57] ABSTRACT

A packing material for chromatographic use which comprises an inorganic carrier having hydroxyl groups at the surface thereof having grafted thereon an α-arylalkylamine derivative which is formed by bonding an optically active α-arylalkylamine and an aminoalkylsilane through a dibasic carboxylic acid, and a method for liquid chromatographic analysis of an enantiomer mixture using this packing material as a stationary phase. The packing material of the present invention can be easily produced by the usual chemical reaction, is chemically stable, and exhibits excellent effects in the separation of an enantiomer mixture of a compound having an —NH— group, —CONH— group, or an —OCO— group bonded to an asymmetric carbon atom thereof.

10 Claims, 2 Drawing Figures

PACKING MATERIALS FOR CHROMATOGRAPHIC USE AND A METHOD FOR ANALYSIS OF AN ENANTIOMER MIXTURE USING THE SAME

TECHNICAL FIELD

The present invention relates to a novel packing material for chromatographic use comprising an inorganic carrier having grafted thereon an optically active organosilane and a method for analysis of enantiomer mixtures of compounds containing an —NH— group, a —CONH— group, or an —OCO— group bonded to an asymmetric carbon atom thereof which comprises separating the enantiomer mixtures using the packing material by means of liquid chromatography.

BACKGROUND TECHNOLOGY

As methods for directly separating and analyzing enantiomer mixtures of compounds containing an asymmetric carbon atom using optically active compound-grafted packing materials by means of liquid chromatography, there have hitherto been only a few of reports, for example, a ligand exchange-method by Davankov et al. in which optically active proline-grafted packing materials are used; a charge transfer complex-method by Gil-Av et al. in which π-electron-lacking and optically active compound-grafted packing materials are used; a method involving separation of N-acylated amino acid esters or N-acylated dipeptide esters using optically active N-acylated amino acid-grafted packing materials by Hara et al.; a method involving separation of 3,5-dinitrobenzoylated amino acids, amines, hydroxy acids, sulfoxides, etc. using optically active 1-(9-anthryl)trifluoroethanol-grafted packing materials, or a method involving separation of aromatic alcohols using 3,5-dinitrobenzoylated and optically active phenylglycine-grafted packing materials by Pirkle et al.; and so on. In these methods, however, compounds useful for analysis are limited to a narrow range, a degree of separation is poor, or grafted packing materials are produced with difficulty so that packing materials have good reproducibility in the quality, etc. It cannot thus be said that these packing materials are practical.

DISCLOSURE OF THE INVENTION

As a result of extensive investigations with an attempt to develop grafted packing materials which are widely applicable to compounds to be analyzed, are relatively easily prepared, are chemically stable and are practical, the present inventors have found that packing materials for chromatographic use obtained by grafting α-arylalkylamine derivatives which are formed by bonding optically active α-arylalkylamines and aminoalkylsilanes through dibasic carboxylic acids, on inorganic carriers having hydroxyl groups at the surface thereof are extremely useful since they not only exhibit an excellent effect for separating enantiomer mixtures of compounds containing an —NH— group, a —CONH— group, or an —OCO— group bonded to an asymmetric carbon atom thereof, but also can easily be prepared by ordinary chemical reactions and are chemically stable, and have reached the present invention.

Namely, the present invention is to provide a packing material for chromatographic use comprising an inorganic carrier having hydroxyl groups at the surface thereof having grafted thereon an α-arylalkylamine derivative which is formed by bonding an optically active α-arylalkylamine and an aminoalkylsilane through a dibasic carboxylic acid and a method for separating and analyzing an enantiomer mixture of a compound containing an —NH— group, a —CONH— group, or an —OCO— group bonded to an asymmetric carbon atom thereof by using the above described packing material as a stationary phase for liquid chromatography.

In the present invention, the grafted α-arylalkylamine derivatives are organosilanes represented by general formula (I):

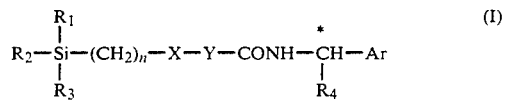

wherein $R_1$, $R_2$ and $R_3$ each, which may be the same or different, is an alkyl group, an alkoxyl group, a hydroxyl group or a halogen atom, with proviso that at least one thereof is an alkoxyl group or a halogen atom; $R_4$ is an alkyl group; Ar is a phenyl group or a naphthyl group, which may be substituted; X is —NHCO— or —N⊕H₃O⊖CO—; Y is a lower alkylene group or a phenylene group; n is an integer of from 2 to 4; and * indicates an asymmetric carbon atom. More specifically, in the α-arylalkylamine derivative represented by the general formula (I), the α-arylalkylamine component is preferably a lower alkylamine substituted in the α-position by an aromatic group. Typical examples include 1-phenylethylamine, 1-(α-naphthyl)ethylamine and the like. The aminoalkylsilane component is preferably an ω-aminoalkylalkoxysilane or an ω-aminoalkylhalogenosilane. Typical examples include ω-aminopropyltriethoxysilane, ω-aminopropyltrichlorosilane and the like. As the dibasic carboxylic acid component, a lower alkylenedicarboxylic acid or p-phenylenedicarboxylic acid can be used. Suitable examples include succinic acid, terephthalic acid and the like.

In the present invention, as inorganic carriers having hydroxyl groups at the surface thereof, silica-containing carriers, e.g., silica gel, are preferred. Shapes of carriers may be any of spherical, ground ones, etc. To obtain columns for chromatographic use having high performance, fine grains having a size as uniform as possible are preferred.

In preparing novel packing materials for chromatographic use in accordance with the present invention, a variety of grafting methods can be adopted as shown below.

(1) A method which comprises reacting aminoalkylsilanes with inorganic carriers having hydroxyl groups at the surface thereof to introduce the aminoalkylsilyl residue at the surface of the inorganic carriers and reacting half-amides comprising optically active α-arylalkylamines and dibasic carboxylic acids followed by subjecting to dehydration-condensation.

More specifically, aminoalkylsilanes represented by general formula (II):

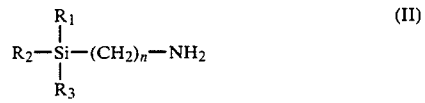

wherein R₁, R₂, R₃, and n have the same meanings as defined above, are reacted with inorganic carriers having hydroxyl groups at the surface thereof to introduce the aminoalkylsilyl residue at the surface of the inorganic carriers by a known method, thereafter, with the obtained materials, half-amides consisting of α-arylalkylamines and dibasic carboxylic acids as represented by the general formula (III):

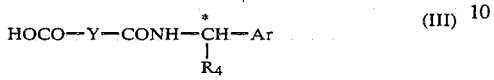
$$\text{HOCO—Y—CONH—}\overset{*}{\text{CH}}\text{—Ar} \atop |\atop R_4 \qquad (III)$$

wherein Y, R₄, Ar, and * are as defined for the general formula (I), such as N-(α-arylalkyl)-p-phenylenedicarboxylic acid monoamides and N-(α-arylalkyl)alkylenedicarboxylic acid monoamides, are reacted, followed by subjecting to dehydration-condensation to obtain the desired packing materials. The half-amides consisting of α-arylalkylamines and dibasic carboxylic acids as represented by the general formula (III) can be synthesized by commonly used methods. For example, dibasic carboxylic acid monoalkyl esters and α-arylalkylamines are subjected to dehydration-condensation by a usual method to obtain amide compounds and, thereafter, by breaking the ester bond thereof with alkalis, the half-amides can be obtained.

(2) A method which comprises grafting α-arylalkylamine derivatives obtained by reacting half-amides consisting of optically active α-arylalkylamines and dibasic carboxylic acids with aminoalkylsilanes, on inorganic carriers having a hydroxyl group at the surface thereof.

More specifically, half-amides represented by the general formula (III) are reacted with aminoalkylsilanes represented by the general formula (II) to obtain organosilanes represented by the general formula (I), which are then grafted on inorganic carriers, such as silica gel, etc., to obtain the desired packing materials.

(3) A method which comprises introducing an aminoalkylsilyl residue at the surface of inorganic carriers as in the method (1) as described above, reacting with dibasic acid anhydrides to obtain half-amides and subjecting the half-amides to dehydration-condensation with optically active α-arylalkylamines.

More specifically, inorganic carriers are reacted at the surface thereof with aminoalkylsilanes represented by the general formula (II) and further reacted with dibasic acid anhydrides, such as succinic anhydride, etc., followed by subjecting to dehydration-condensation with optically active α-arylalkylamines represented by the general formula (IV):

$$\text{H}_2\text{N—}\overset{*}{\text{CH}}\text{—Ar} \atop |\atop R_4 \qquad (IV)$$

wherein R₄, Ar, and * are as defined for the general formula (I) to obtain the desired packing materials.

The packing materials having optically active α-arylalkylamine residues obtained in the present invention are packed in a column for chromatographic use in a conventional manner and employed as a stationary phase for liquid chromatography. By choosing appropriate conditions for elution in liquid chromatography using the stationary phase, enantiomer mixtures of compounds containing an —NH— group, a —CONH— group, or an —OCO— group bonded to an asymmetric carbon atom thereof can be separated and analyzed with good separability in a short period of time.

BEST MODE FOR CARRYING OUT THE INVENTION

Example 1

After 10 g of silica gel (average grain diameter: 10 μm; average pore diameter: 60 Å; surface area: 500 m²/g) was dried at 130° C. for 4 hours in a vacuum drier, silica gel was added to a solution of 20 g of 3-aminopropyltriethoxysilane dissolved in 200 ml of dry toluene, followed by stirring at 60° C. for 6 hours. The reaction mixture was filtered, and the residue was washed with 100 ml of acetone and dried to obtain 3-aminopropylsilylated silica gel (APS). The elemental analysis showed N: 0.85% and C: 3.40%, which means that about 0.90 mmol of the 3-aminopropyl group was grafted based on 1 g of the silica gel. Then 30 ml of water was added to 3 g of APS to prepare a slurry, and after sufficiently deaerating under reduced pressure, 2.5 g of succinic anhydride was added thereto in small portions over about 20 minutes. During this process, the pH of the reaction mixture was adjusted to 4 with a 2N sodium hydroxide solution. The mixture was gently stirred at room temperature for 5 hours and then filtered. The residue was washed four times with 30 ml of water, twice with 30 ml of methanol, and then with 30 ml of diethyl ether, followed by drying to obtain N-(3-carboxypropionyl)aminopropylsilylated silica gel. Then 30 ml of tetrahydrofuran was added thereto, and after sufficiently deaerating under reduced pressure, 3 g of N,N'-carboxydiimidazole was added thereto while cooling with ice, followed by gently stirring for 3 hours. Then 3 g of (−)-1-(α-naphthyl)ethylamine was added thereto in small portions, gently stirred at room temperature for 5 hours, and then allowed to stand overnight. The reaction mixture was filtered, and the residue was washed four times with 30 ml of tetrahydrofuran, twice with 30 ml of methanol, and then twice with 30 ml of diethyl ether, followed by drying to obtain a desired packing material having a (−)-1-(α-naphthyl)ethylamino group. The elemental analysis showed N: 1.94% and C: 11.60%, which means that about 0.51 mmol of the (−)-1-(α-naphthyl)ethylamine derivative was grafted based on 1 g of the silica gel.

Figure 1:
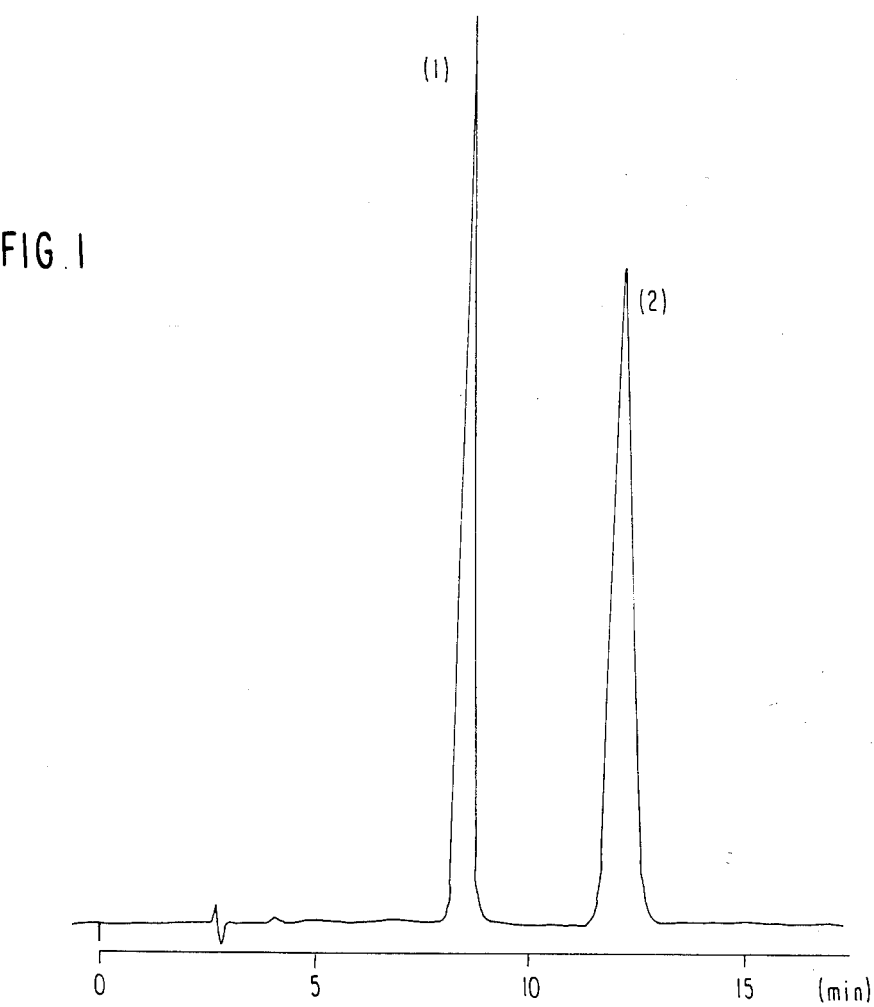
FIGS. 1 and 2 are chromatogram obtained in Examples 1 and 2, respectively, as described hereinafter, wherein the ordinate represents an intensity and the abscissa represents retention time.

The obtained packing material was packed as a slurry in a stainless steel-made column having an inner diameter of 4 mm and a length of 25 cm, and N-(3,5-dinitrobenzoyl)-(±)-1-phenylethylamine was analyzed under the following conditions to obtain a chromatogram shown in FIG. 1.

Temperature: room temperature.
Mobile Phase: n-hexane/1,2-dichloroethane/ethanol=40/12/3.
Flow Rate: 1 ml/min.
Detector: UV photometer (wavelength 254 nm).

In FIG. 1, peak Nos. (1) and (2) show peaks of N-(3,5-dinitrobenzoyl)-(+)-1-phenylethylamine and N-(3,5-dinitrobenzoyl)-(−)-1-phenylethylamine, respectively.

A time period required for eluting the peak No. (2) was for about 12 minutes, a separation factor was 1.63, and a ratio of the peak area No. (1) to the peak No. (2) was 50:50.

Example 2

10 g of monomethyl terephthalate and 6.5 g of N-hydroxysuccinic acid imide were dissolved in 100 ml of dry tetrahydrofuran, and 11.8 g of N,N'-dicyclohexylcarbodiimide was added thereto while cooling with ice, followed by allowing to stand overnight at 5° C. The precipitate was filtered off, and the filtrate was evaporated under reduced pressure. The residue was dissolved in 50 ml of dry tetrahydrofuran. To this solution was added 10 g of (−)-1-(α-naphthyl)ethylamine, and the resulting mixture was stirred at room temperature for 5 hours and at 50° C. for 2 hours. The solvent was evaporated under reduced pressure, and the residue was dissolved in ethyl acetate, washed twice with 50 ml of 1N hydrochloric acid and then twice with 50 ml of water. The solvent was evaporated under reduced pressure, and the residue was recrystallized from a mixture of n-hexane and ethyl acetate to obtain 15 g of a compound represented by the following formula as white crystals.

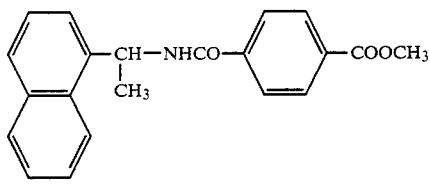

Melting Point: 146°–147° C.

|  | Elemental Analysis: | | |
|---|---|---|---|
|  | Carbon (%) | Hydrogen (%) | Nitrogen (%) |
| Calculated | 75.65 | 5.74 | 4.20 |
| Found | 75.15 | 5.80 | 4.47 |

Optical Rotation: $[\alpha]_D^{20} = +57.20°$ (c=1.99%, tetrahydrofuran).

Then 10 g of this compound was dissolved in 100 ml of methanol, and 25 ml of a 2N sodium hydroxide solution was added thereto, followed by allowing to stand overnight. The reaction mixture was concentrated under reduced pressure to remove the major portion of the organic solvent, and 100 ml of water was added thereto. In addition, 2N hydrochloric acid was added dropwise while cooling with ice to acidify the mixture (pH: 3–4). The precipitate was collected by filtration, washed with water, and recrystallized from a mixture of methanol and diethyl ether to obtain 12 g of a compound represented by the following formula as white crystals.

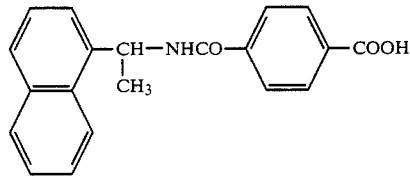

Melting Point: 238°–240° C.

|  | Elemental Analysis: | | |
|---|---|---|---|
|  | Carbon (%) | Hydrogen (%) | Nitrogen (%) |
| Calculated | 75.22 | 5.37 | 4.39 |
| Found | 74.68 | 5.36 | 4.44 |

Optical Rotation: $[\alpha]_D^{20} = +51.5°$ (c=1.78%, tetrahydrofuran).

10 g of this compound and 6.5 g of N-hydroxysuccinic acid imide were dissolved in 100 ml of dry tetrahydrofuran, and 6.5 g of N,N'-dicyclohexylcarbodiimide was added thereto while cooling with ice. The reaction mixture was allowed to stand overnight at 5° C. The precipitate was filtered off, and the filtrate was evaporated under reduced pressure. The residue was recrystallized from a mixture of ethyl acetate and n-hexane to obtain 11 g of a compound represented by the following formula as white crystals.

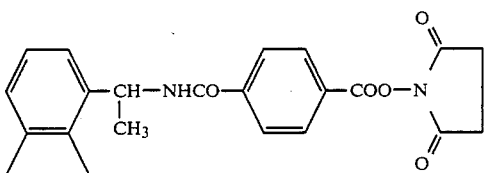

Melting Point: 165°–166° C.

|  | Elemental Analysis: | | |
|---|---|---|---|
|  | Carbon (%) | Hydrogen (%) | Nitrogen (%) |
| Calculated | 69.22 | 4.84 | 6.73 |
| Found | 69.20 | 4.85 | 6.79 |

Optical Rotation: $[\alpha]_D^{20} = +50.8°$ (c=2.05%, tetrahydrofuran).

Then 6 g of this compound was added to a liquid prepared by suspending 2.5 g of the 3-aminopropylsilylated silica gel as obtained in Example 1 in 30 ml of dry tetrahydrofuran and then sufficiently deaerating under reduced pressure. The mixture was gently stirred at room temperature for 5 hours and then at 50° C. for 5 hours. After allowing to stand for cooling to room temperature, the resulting mixture was washed three times with 30 ml of tetrahydrofuran, twice with 30 ml of methanol, and then twice with 30 ml of diethyl ether, followed by drying to obtain a desired packing material having a (−)-1-(α-naphthyl)ethylamino group. The elemental analysis showed N: 1.73% and C: 13.15%, which means that about 0.48 mmol of the (−)-1-(α-naphthyl)ethylamine derivative was grafted based on 1 g of the silica gel.

Figure 2:
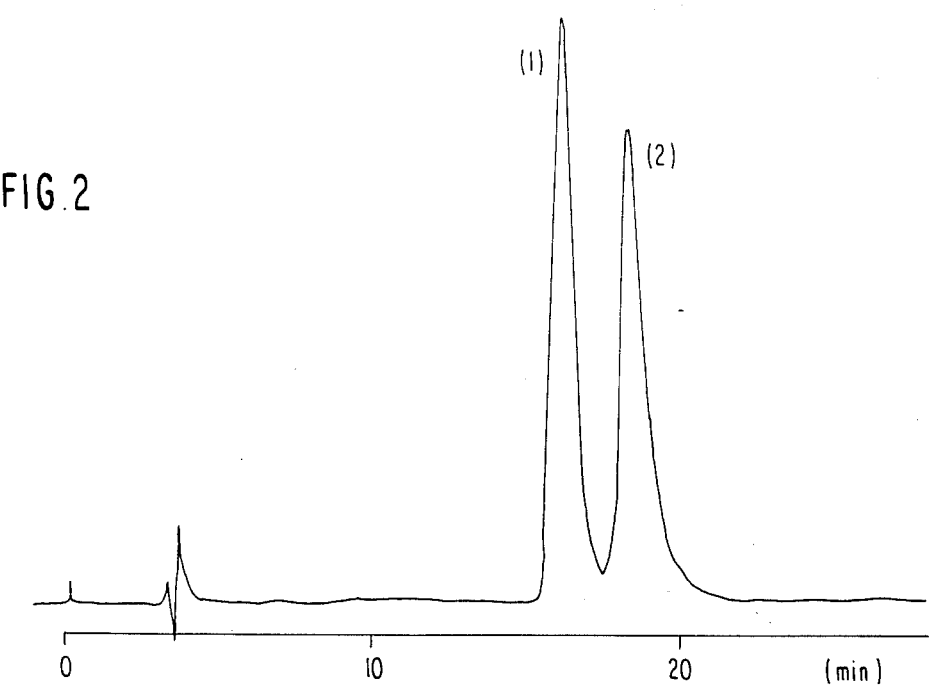

The obtained packing material was packed as a slurry in a stainless steel-made column having an inner diameter of 4 mm and a length of 25 cm, and (±)-2-(4-chlorophenyl)isovaleric acid t-butyl amide was analyzed under the following conditions to obtain a chromatogram shown in FIG. 2.

Temperature: room temperature.
Mobile Phase: n-hexane/isopropyl alcohol=200/1.
Flow Rate: 1 ml/min.
Detector: UV photometer (wavelength 254 nm).

In FIG. 2, peak Nos. (1) and (2) show peaks of t-butyl (+)-2-(4-chlorophenyl)isovalerate and t-butyl (−)-2-(4- chlorophenyl)isovalerate, respectively. A time period required for eluting the peak No. (2) was for about 19 minutes, a separation factor was 1.16, and a ratio of the peak area No. (1) to the peak area No. (2) was 50:50.

Example 3

10 g of monoethyl succinate and 7.9 g of N-hydroxysuccinic acid imide were dissolved in 100 ml of dry tetrahydrofuran, and 14.4 g of N,N'-dicyclohexylcarbodiimide was added thereto while cooling with ice, followed by allowing to stand overnight at 5° C. The precipitate was filtered off, and the filtrate was evaporated under reduced pressure. The residue was dissolved in 50 ml of dry tetrahydrofuran. To this solution was added 13 g of (+)-1-(α-naphthyl)ethylamine, and the mixture was stirred at room temperature for 5 hours and at 50° C. for 2 hours. The solvent was evaporated under reduced pressure, and the residue was dissolved in ethyl acetate, washed twice with 50 ml of 1N hydrochloric acid and twice with 50 ml of water. The solvent was evaporated under reduced pressure. The residue was dissolved in 100 ml of methanol, and 25 ml of a 2N sodium hydroxide solution was added thereto, followed by allowing to stand overnight. The reaction mixture was concentrated under reduced pressure to remove the major portion of the organic solvent, and then 100 ml of water was added thereto. The resulting mixture was acidified (pH: 3-4) by adding dropwise 2N hydrochloric acid while cooling with ice. The precipitate was extracted three times with 100 ml of ethyl acetate and then washed three times with 50 ml of water. The organic layer was dried over anhydrous sodium sulfate, and the filtrate was then evaporated under reduced pressure. The residue was recrystallized from a mixture of ethyl acetate and n-hexane to obtain 13 g of a compound represented by the following formula:

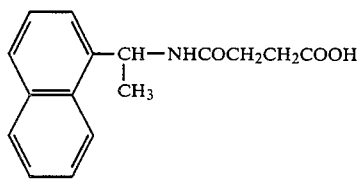

Melting Point: 155°–156° C.

| | Elemental Analysis: | | |
|---|---|---|---|
| | Carbon (%) | Hydrogen (%) | Nitrogen (%) |
| Calculated | 70.83 | 6.32 | 5.16 |
| Found | 70.43 | 6.33 | 5.21 |

Optical Rotation: $[\alpha]_D^{20} = -54.5°$ (c=2.03%, tetrahydrofuran).

Then 3 g of this compound was added to a liquid prepared by suspending 2.5 g of the 3-aminopropylsilylated silica gel as obtained in Example 1 in 20 ml of dry tetrahydrofuran and then sufficiently deaerating under reduced pressure, followed by gently stirring one day and night at room temperature. The mixture was washed four times with 30 ml of tetrahydrofuran, twice with 30 ml of methanol, and further twice with 30 ml of diethyl ether, followed by drying to obtain a desired packing material having a (+)-1-(α-naphthyl)ethylamino group. The elemental analysis showed N: 1.68% and C: 10.17%, which means that about 0.45 mmol of the (+)-1-(α-naphthyl)ethylamine derivative was grafted based on 1 g of the silica gel.

Example 4

5 g of N-succinyl-(+)-1-(α-naphthyl)ethylamine as obtained in Example 3 and 2.1 g of N-hydroxysuccinic acid imide were dissolved in 30 ml of dry tetrahydrofuran, and 3.8 g of N,N'-dicyclohexylcarbodiimide was added thereto while cooling with ice. After allowing the mixture to stand overnight at 5° C., the precipitate was filtered off, and the filtrate was evaporated under reduced pressure.

The residue was then added to a liquid prepared by suspending 2.5 g of the 3-aminopropylsilylated silica gel as obtained in Example 1 in 30 ml of dry tetrahydrofuran and sufficiently deaerating under reduced pressure, and the mixture was gently stirred at room temperature for 5 hours and then at 50° C. for 3 hours. After allowing to stand for cooling to room temperature, the resulting mixture was washed four times with 30 ml of tetrahydrofuran, twice with 30 ml of methanol, and further twice with 30 ml of diethyl ether, followed by drying to obtain a desired packing material having a (+)-1-(α-naphthyl)ethylamino group. The elemental analysis showed N: 1.92% and C: 12.01%, which means that about 0.50 mmol of the (+)-1-(α-naphthyl)ethylamine derivative was grafted based on 1 g of the silica gel.

Examples 5 to 12

The packing material having a (−)-1-(α-naphthyl)ethylamino group as obtained in Example 2 was packed as a slurry in a stainless steel-made column having an inner diameter of 4 mm and a length of 25 cm and used for the separation of enantiomer mixtures of compounds as described below under the following condition, to thereby determine a separation factor.

Temperature: room temperature.
Flow Rate in Mobile Phase: 1 ml/min.
Detector: UV photometer (wavelength 254 nm) The results are tabulated below.

TABLE

| Example No. | Compound Analyzed | Mobile Phase* | Capacity Factor (k') First Peak | Capacity Factor (k') Second Peak | Separation Factor |
|---|---|---|---|---|---|
| 5 | N—(3,5-Dinitrobenzoyl)-(±)-1-(α-naphthyl)ethylamine | C | 4.23 | 9.54 | 2.25 |
| 6 | N—(3,5-Dinitrobenzoyl)-(±)-1-(α-naphthyl)ethylamine | D | 1.87 | 4.05 | 2.17 |
| 7 | N—(3,5-Dinitrobenzoyl)-(±)-2-octylamine | B | 2.93 | 3.50 | 1.20 |
| 8 | N—(3,5-Dinitrobenzoyl)-DL-alanine methyl ester | B | 5.48 | 7.86 | 1.43 |
| 9 | N—(3,5-Dinitrobenzoyl)-DL-valine n-butylamide | B | 1.13 | 1.75 | 1.55 |
| 10 | (±)-α-Methylphenylacetic acid 3,5-dinitroanilide | B | 6.35 | 12.27 | 1.93 |

TABLE-continued

| Example No. | Compound Analyzed | Mobile Phase* | Capacity Factor (k') First Peak | Capacity Factor (k') Second Peak | Separation Factor |
|---|---|---|---|---|---|
| 11 | (±)-α-Bromo-t-butylacetic acid 3,5-dinitroanilide | B | 4.71 | 6.29 | 1.33 |
| 12 | O—(3,5-Dinitrobenzoyl)-(±)-1-(α-naphthyl)ethyl alcohol | A | 7.18 | 7.80 | 1.09 |

Note:
A: n-Hexane/isopropyl alcohol (100:1)
B: n-Hexane/1,2-dichloroethane/ethanol (20:6:1)
C: n-Hexane/1,2-dichloroethane/ethanol (10:4:1)
D: Methanol/water (17:3)

What is claimed is:

1. A packing material for chromatographic use which comprises an inorganic carrier having hydroxyl groups at the surface thereof having grafted thereon an α-arylalkylamine derivative which is formed by bonding an optically active α-arylalkylamine and an aminoalkylsilane through a dibasic carboxylic acid, wherein the grafted α-arylalkylamine derivative is an organosilane represented by general formula (I):

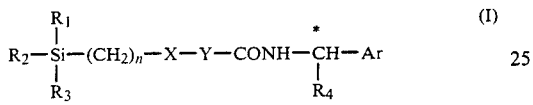

wherein $R_1$, $R_2$ and $R_3$ each, which may be the same or different, is an alkyl group, an alkoxyl group, a hydroxyl group or a halogen atom, with proviso that at least one thereof is an alkoxyl group or a halogen atom; $R_4$ is an alkyl group; Ar is a naphthyl group, which may be substituted; X is —NHCO— or —N⊕H$_3$.O⊖CO—; Y is a lower alkylene group or a phenylene group; n is an integer of from 2 to 4; and * indicates an asymmetric carbon atom.

2. A packing material for chromatographic use as claimed in claim 1, wherein said inorganic carrier having hydroxyl groups at the surface thereof is silica gel.

3. A packing material for chromatographic use as claimed in claim 2, wherein the α-arylalkylamine residue in general formula (I) is an optically active 1-(α-naphthyl)ethylamine residue.

4. A packing material for chromatographic use as claimed in claim 2 or 3, wherein the aminoalkylsilane residue in general formula (I) is an ω-aminopropyltriethoxysilane residue or an ω-aminopropyltrichlorosilane residue.

5. A packing material for chromatographic use as claimed in claim 4, wherein the dibasic carboxylic acid residue in general formula (I) is a succinic acid residue or a terephthalic acid residue.

6. A method for liquid chromatographic analysis which comprises separating and analyzing an enantiomer mixture of a compound having an —NH— group, a —CONH— group, or an —OCO— group bonded to an asymmetric carbon atom thereof by using a packing material for chromatographic use comprising an inorganic carrier having hydroxyl groups at the surface thereof having grafted thereon an α-arylalkylamine derivative which is formed by bonding an optically active α-arylkalkylamine and an aminoalkylsilane through a dibasic carboxylic acid, wherein the grafted α-arylalkylamine derivative is an organosilane represented by general formula (I):

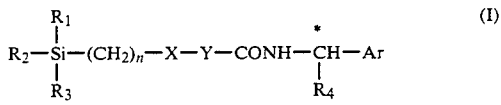

wherein $R_1$, $R_2$ and $R_3$ each, which may be the same or different, is an alkyl group, an alkoxyl group, a hydroxyl group or a halogen atom, with proviso that at least one thereof is an alkoxyl group or a halogen atom; $R_4$ is an alkyl group; Ar is a naphthyl group, which may be substituted; X is —NHCO— or —N⊕H$_3$.O⊖CO—; Y is a lower alkylene group or a phenylene group; n is an integer of from 2 to 4; and * indicates an asymmetric carbon atom.

7. A method for analysis as claimed in claim 6, wherein said inorganic carrier having hydroxyl groups at the surface thereof is silica gel.

8. A method for analysis as claimed in claim 7, wherein the α-arylalkylamine residue in general formula (I) is an optically active 1-(α-naphthyl)ethylamine residue.

9. A method for analysis as claimed in claim 7, wherein the aminoalkylsilane residue in general formula (I) is an ω-aminopropyltriethoxysilane residue or an ω-aminopropyltrichlorosilane residue.

10. A method for analysis as claimed in claim 9, wherein the dibasic carboxylic acid residue in general formula (I) is a succinic acid residue or a terephthalic acid residue.

* * * * *